(12) United States Patent
Lempriere

(10) Patent No.: US 6,182,587 B1
(45) Date of Patent: Feb. 6, 2001

(54) IN-LINE SUB-SURFACE SEEDING, FERTILIZING AND WATERING DEVICE

(76) Inventor: Noel D. Lempriere, Box 1178, Barriere, British Columbia (CA), V0E 1E0

(*) Notice: Under 35 U.S.C. 154(b), the term of this patent shall be extended for 0 days.

(21) Appl. No.: 09/419,626

(22) Filed: Oct. 18, 1999

Related U.S. Application Data

(60) Provisional application No. 60/104,731, filed on Oct. 19, 1998.

(51) Int. Cl.$^7$ ........................................................ A01C 5/08
(52) U.S. Cl. ........................... 111/124; 111/188; 111/129; 111/73; 111/80; 111/187
(58) Field of Search ............................... 111/73, 129, 186, 111/187, 188, 92, 80, 124

(56) References Cited

U.S. PATENT DOCUMENTS

| | | | |
|---|---|---|---|
| 4,388,878 | 6/1983 | Demzin | 111/86 |
| 4,638,748 | 1/1987 | Kopecky | 111/7 |
| 4,653,412 | 3/1987 | Clarke | 111/73 |
| 4,770,112 | 9/1988 | Neumeyer | 111/73 |

FOREIGN PATENT DOCUMENTS 1211992    9/1986 (CA) ............................... A01C/5/06

Primary Examiner—Christopher J. Novosad
(74) Attorney, Agent, or Firm—Antony C. Edwards

(57) ABSTRACT

A sub-surface seeding, fertilizing and watering device includes an opening blade. The opening blade has first and second sides extending between a leading edge and an aft edge on the blade. The first and second sides are generally symmetrical to each other. The opening blade is mountable to a material feeder so as to be generally vertically disposed when mounted thereon for partial submerging into soil to a first submerged depth during forward translation advancing the leading edge through the soil. First and second wings are mounted to the first and second sides respectively in generally oppositely disposed relation so as to be cantilevered outwardly therefrom. The first and second wings have first and second aft-opening wing apertures. First and second conduits cooperate with the first and second aft opening wing apertures for seed, fertilizer or fluid flow, as fed therethrough from the material feeder during the forward translation.

45 Claims, 8 Drawing Sheets

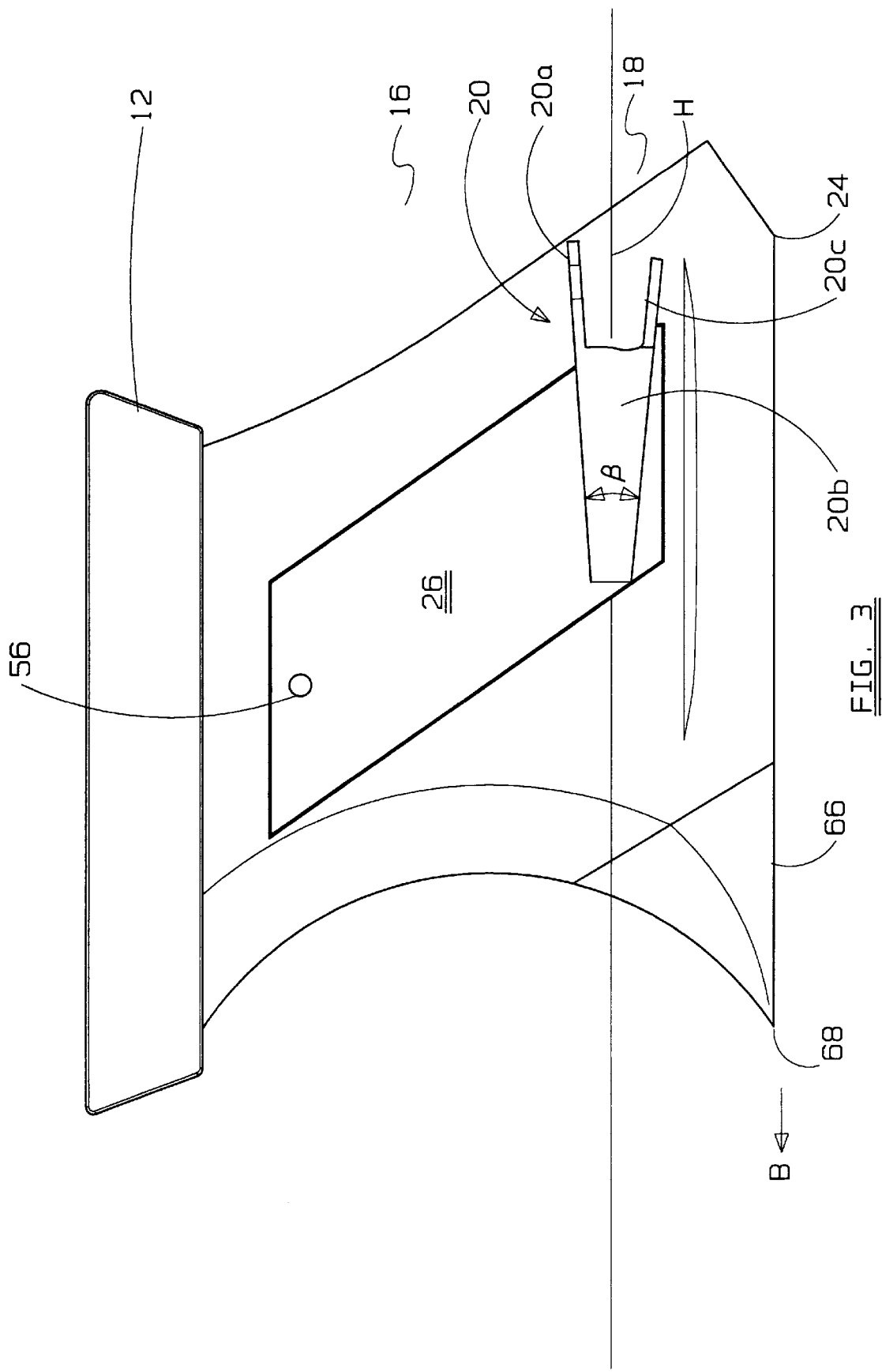

IN-LINE SUB-SURFACE SEEDING, FERTILIZING AND WATERING DEVICE

CROSS REFERENCE TO RELATED APPLICATION

This application claims priority from U.S. Provisional Patent Application No. 60/104,731 filed Oct. 19, 1998 titled In-Line Sub-Surface Seeding, Fertilizing and Watering Device.

FIELD OF THE INVENTION

This invention relates to the field of no-tillage opening blades which may be partially submerged into earth, for example in a farmers field, so as to pass the blade at a submerged depth for delivery of seeds, fertilizer or water into the earth.

BACKGROUND OF THE INVENTION

This invention relates to blade delivery systems which have replaced tillage plows and the like. It is known that the use of plows or other devices having for example tillage discs for tilling the earth or otherwise opening and turning a furrow through the ground suffer from the disadvantage that the moisture in the soil is unnecessarily exposed to evaporation. In the past it was necessary to open the earth so that the ground beneath the surface could be seeded, fertilized and watered. Whether this was accomplished by machinery or done manually, prior art machines or manual systems also suffered from the disadvantage that fertilizer was typically delivered into close proximity to the seeds being sown occasionally resulting in the seeds becoming chemically burnt.

Thus there exists a need for, and it is an object of the present invention to provide, a blade which can be partially submerged into earth and translated therethrough, where the blade disturbs the earth minimally and without tillage and is adapted to deliver one or all of seeds, fertilizer or water from the blade in advantageous spaced apart relation as hereinafter described.

SUMMARY OF THE INVENTION

In summary, the sub-surface seeding, fertilizing and watering device of the present invention includes an opening blade having first and second sides extending between a leading edge and an aft edge. The first and second sides are advantageously generally symmetrical to each other on either side of a first plane, where the first plane generally bisects the opening blade, and the leading edge and the aft edge lie generally in the first plane.

The opening blade has an upper surface and a lower surface extending between upper and lower edges respectively of the first and second sides of the blade. First and second wings are mounted to the first and second sides respectively in generally oppositely disposed relation so as to be cantilevered outwardly therefrom. The first and second wings extend between first and second forward wing edges and first and second aft-opening wing apertures in the first and second wings respectively. The first and second wings are mounted to the first and second sides at, respectively, first and second distances from the lower surface measured generally parallel to the first plane.

The opening blade has therethrough, and generally lying in the first plane, first and second conduits, extending from, and cooperating with, at uppermost ends thereof, first and second infeed ports in the upper surface. The first and second conduits cooperate with, at lowermost ends thereof, first and second wing ducts extending aft through the first and second wings respectively between the lowermost ends of the first and second conduits and the first and second aft opening wing apertures. The first and second conduits and the corresponding first and second wing ducts are thereby in material flow communication between the first and second infeed ports and the corresponding first and second aft opening wing apertures for seed, fertilizer or fluid flow, as fed from a material feeder, therethrough during the forward translation of the blade.

The opening blade is mountable to the material feeder so as to be generally vertically disposed, when mounted thereon, for partial submerging into soil to a first submerged depth advancing the leading edge through the soil. The first and second distances are less than the first submerged depth so that the first and second wings are submerged in the soil during the forward translation of the blade.

In one preferred embodiment, the opening blade further includes a third conduit extending in material flow communication between a third infeed port in the upper surface and an aft opening blade aperture in a rearward position on the opening blade in proximity to the aft edge for seed, fertilizer or fluid flow therethrough, as fed from the material feeder. Advantageously, the aft-opening blade aperture is centrally disposed relative to the first plane so as to lie generally symmetrically across the first plane, and may be positioned so that the aperture intersects the lower surface of the blade. Thus the aft-opening blade aperture is formed at the intersection of the lower surface and the aft edge of the blade. The aft-opening blade aperture may lie in a second plane at generally 30° inclined relative to a third plane generally containing the lower surface of the blade, wherein the third plane is generally orthogonal to the first plane.

Advantageously, the first, second and third conduits are generally parallel and raked aft of their corresponding first, second and third infeed ports. The first, second and third conduits may be raked aft at an angle of approximately 55° relative to a fourth plane generally containing the upper surface of the blade if the upper surface is a planar generally horizontal surface, although this is not necessarily so.

In one embodiment, but not so as to be limiting, at least the first and second conduits are formed by mating of corresponding opposed facing channels in oppositely mounted side panels, oppositely mounted in, or mountable into, first and second sides of the blade.

In a further aspect of the invention, the third conduit is generally parallel and adjacent the aft edge and the leading edge is concavely curved and forms a pointed toe at the intersection of the leading edge and the lower surface of the blade. Advantageously, the pointed toe may be made of hardened material relative to the hardness of material forming the balance of the opening blade.

In a further aspect, the opening blade may be defined as having a longitudinal length dimension and a height dimension, where the longitudinal length dimension is perpendicular to the height dimension and both dimensions lie in the first plane. Further, the opening blade has a lateral width dimension perpendicular to the first plane.

The longitudinal length dimension extends between the leading and aft edges of the blade, the height dimension extends between the upper and lower surfaces of the blade, and the lateral width dimension extends between the first and second sides of the blade. In the present invention, the length dimension is much, that is, significantly greater than the width dimension, as described hereinafter. The height dimension in one embodiment is greater than the submerged depth so that the blade is supported above the soil and the blade is thus partially submerged during forward translation, although this is not intended to be limiting. That is, it is readily conceivable to mount the blade to a support that itself becomes partially submerged in the soil.

Further advantageously, the first and second wings are wedge-shaped and the forward wing edges are vertices of the wedge-shaped wings.

The sides of the blade may be thought of as having upper and lower portions respectively above and below the wings. Thus, the first and second sides have upper portions generally located between, respectively, the first and second wings and the upper surface of the blade, and lower portions generally located between, respectively, the first and second wings and the lower surface of the blade. In one aspect of this invention, the lower portions collectively form a waisted shape so that a forward width dimension of a forward flared portion of the lower portion of the opening blade and an aft width dimension of an aft flared portion of the lower portion of the opening blade, the forward and aft width dimensions extending between the lower portions of the first and second sides, are greater than an intermediate width dimension of a waisted portion longitudinally extending contiguously between the forward and aft flared portions.

The first wing may be defined as being set back a first longitudinal distance from the leading edge and the second wing as being set back a second longitudinal distance from the leading edge. Thus, in another aspect of this invention, the first longitudinal distance may be greater than the second longitudinal distance. Correspondingly, the first wing may be mounted to the first side of the blade at a first longitudinal location generally corresponding to the aft flared portion of the blade, and the second wing may be mounted to the second side of the blade at a second longitudinal location generally corresponding to the waisted portion of the blade.

In yet a further aspect of the present invention, in the wing design, upper wing surfaces on the first and second wings extend aft over the corresponding first and second aft-opening wing apertures on aft cantilevered upper wing members. The lower wing surface on the first and second wings may form a first wedge angle of approximately 5° with the upper wing surface. Further, laterally outer-most wing surfaces extend between the upper and lower wing surfaces. The laterally outer-most wing surfaces may advantageously intersect the corresponding first and second sides of the blade at their corresponding first and second forward wing edges. Thus the laterally outer-most wing surfaces may form a second wedge angle of approximately 5° relative to the first and second sides of the blade respectively.

Advantageously, the first and second wings may themselves also be inclined downwardly so that a pair of corresponding planes bisecting the wedge angle between the upper and lower wing surfaces on each of the first and second wings, where the pair of corresponding planes contain the corresponding forward wing edges, are inclined forwardly and downwardly at approximately 5° relative to a generally horizontal plane containing the lower surface, it being taken for the sake of this defined relationship that the lower surface is generally planar and horizontal, although this is not intended to be limiting, and is not necessarily so, notwithstanding that the preferred embodiment hereinafter described is illustrated as such.

BRIEF DESCRIPTION OF THE DRAWINGS

FIG. 3 is, in left side elevation view, the device of FIG. 1.

DETAILED DESCRIPTION OF PREFERRED EMBODIMENTS

Figure 1:
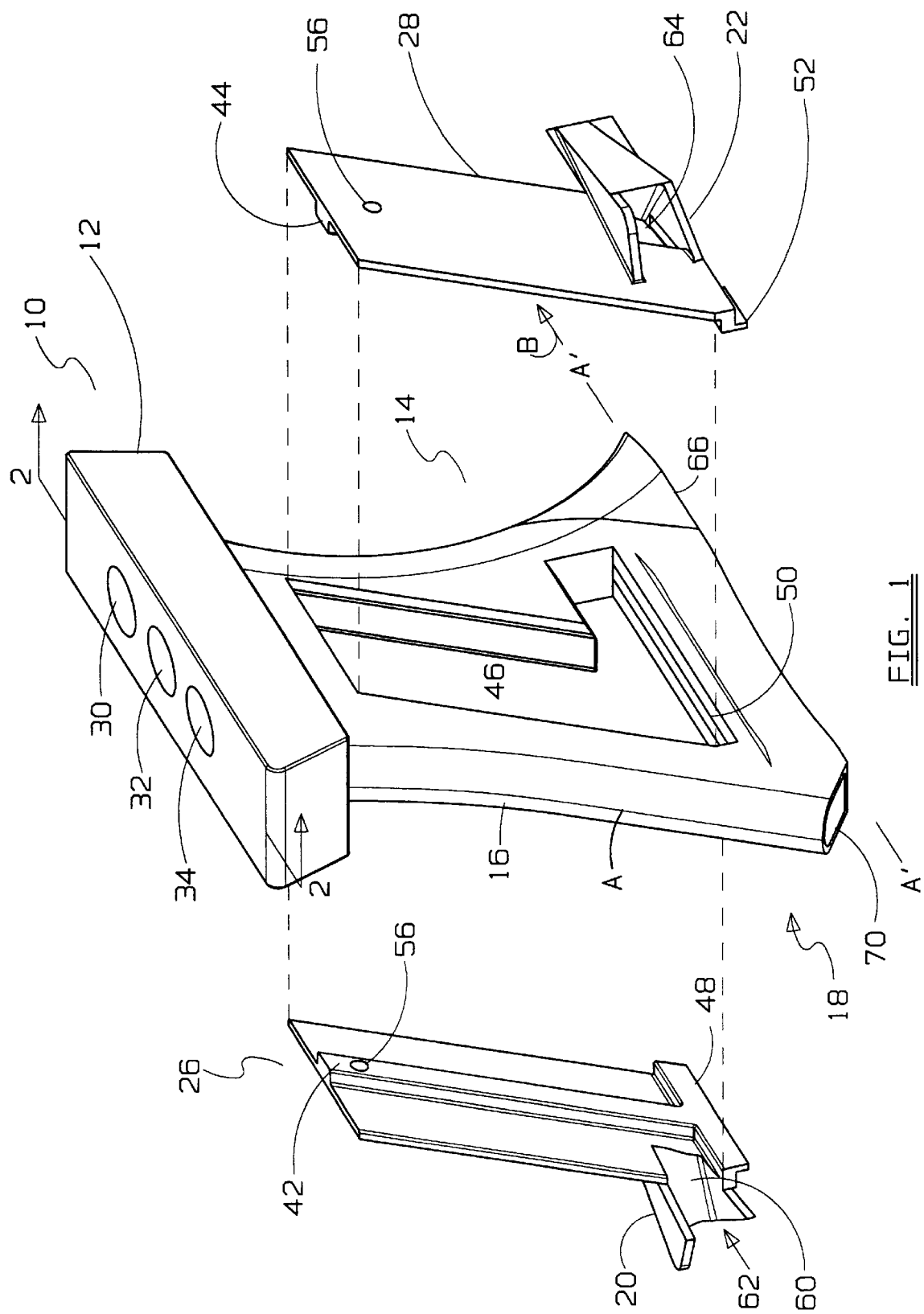
FIG. 1 is, in exploded perspective view, the inline, subsurface seeding, fertilizing and watering device of the present invention.

As may be seen in FIG. 1, the no-tillage in-line subsurface seeding, fertilizing and watering device of the present invention is depicted in one preferred embodiment as opening blade 10. Opening blade 10 has an upper, ported, mounting block 12 rigidly mounted atop a generally planar blade structure 14. Blade structure 14 has a trunk 16 depending generally vertically beneath the upper ported mounting block 12. Formed as part of the lower end of trunk 16 is a foot structure generally indicated by numeral 18.

As also seen in FIGS. 2–5, mounting block 12 and blade 14, including trunk 16 and foot 18, are elongate in a generally vertical first plane A. The first plane includes longitudinal axis A'. With the exception of wings 20 and 22, as better described below, the outer surface of trunk 16 smoothly merges into, so as to truncate in cross-section as, a waisted or shoe sole shaped foot lower surface 24. In one embodiment access panels 26 and 28, which conformally mount onto the lateral side walls of trunk 16, are symmetrically shaped relative to the plane of symmetry of trunk 16. The plane of symmetry of trunk 16 coincides with the first plane.

Upper ported mounting block 12 has ports 30, 32 and 34 formed in its upper surface. The ports extend downwardly through block 12 in cooperative alignment with corresponding channels 36, 38 and 40 extending downwardly in generally parallel spaced apart array through trunk 16. Channel 40 also extends downwardly through foot 18.

Channels 36 and 38 may, in one preferred embodiment not intended to be limiting, be formed by the alignment and snug adjacency of flanges 42 and 44 on the inner sides of access panels 26 and 28 respectively when the access panels are mounted conformally in opposed relation, to the lateral sides of trunk 16 so as to cover cavity 46 in trunk 16. Access panel 26 may be mounted onto the port side of trunk 16 by means of tab 48 slidably engaging corresponding slot 50 formed in the lower surface defining cavity 46, so as to protrude downwardly into foot 18. In a similar fashion, tab 52 on access panel 28 also slidably engages slot 50 when mounting access panel 28 onto the starboard side of trunk 16. The upper ends of access panels 26 and 28 may be secured by releasable fasteners, for example a cooperating, flush-mounted nut and bolt pair (not shown) journalled through apertures 56.

With access panels 26 and 28 mounted onto trunk 16, so as to cooperatively align and abut flanges 42 and 44, thereby completing forming and separation of channels 36 and 38, channels 36 and 38 form a pair of chutes in cooperative alignment between ports 30 and 32 in mounting block 12 and corresponding lower outlet ports 58 and 60. Lower outlet ports 58 and 60 are directed laterally oppositely and open into the respective interior ducts 62 and 64 formed within respective wings 20 and 22. Interior ducts 62 and 64 open out into corresponding aft-facing apertures from under their respective wings 20 and 22 as better hereinafter described.

Toe 66, which may be of a different and hardened material relative to the material forming mounting block 12, trunk 16 and foot 18, is rigidly mounted, by bolting or other means known in the art, to the forward portion of foot 18 so as to form a forwardly extending point or snout 68, forwardly facing in the direction of forward translation B when the blade is translated in use. Advantageously, mounting block 12, trunk 16 and foot 18 may be made of austempered ductile iron (hereinafter ADI) and toe 66 may be made of a chrome alloy. Access panels 26 and 28 and wings 20 and 22 may also be made of ADI.

Channel 40 is formed within and along the rear or aft edge of trunk 16 and foot 18 so as to form a continuous generally linear conduit between port 34 and rear aperture 70. Advantageously, the rear-most end of foot lower surface 24 is upturned for example as to provide aperture 70 with an opening generally perpendicular to the longitudinal axis of channel 40. Further advantageously, channels 36, 38 and 40 are generally parallel so as to be raked aft in a downward direction from ports 30, 32 and 34.

Figure 3A:
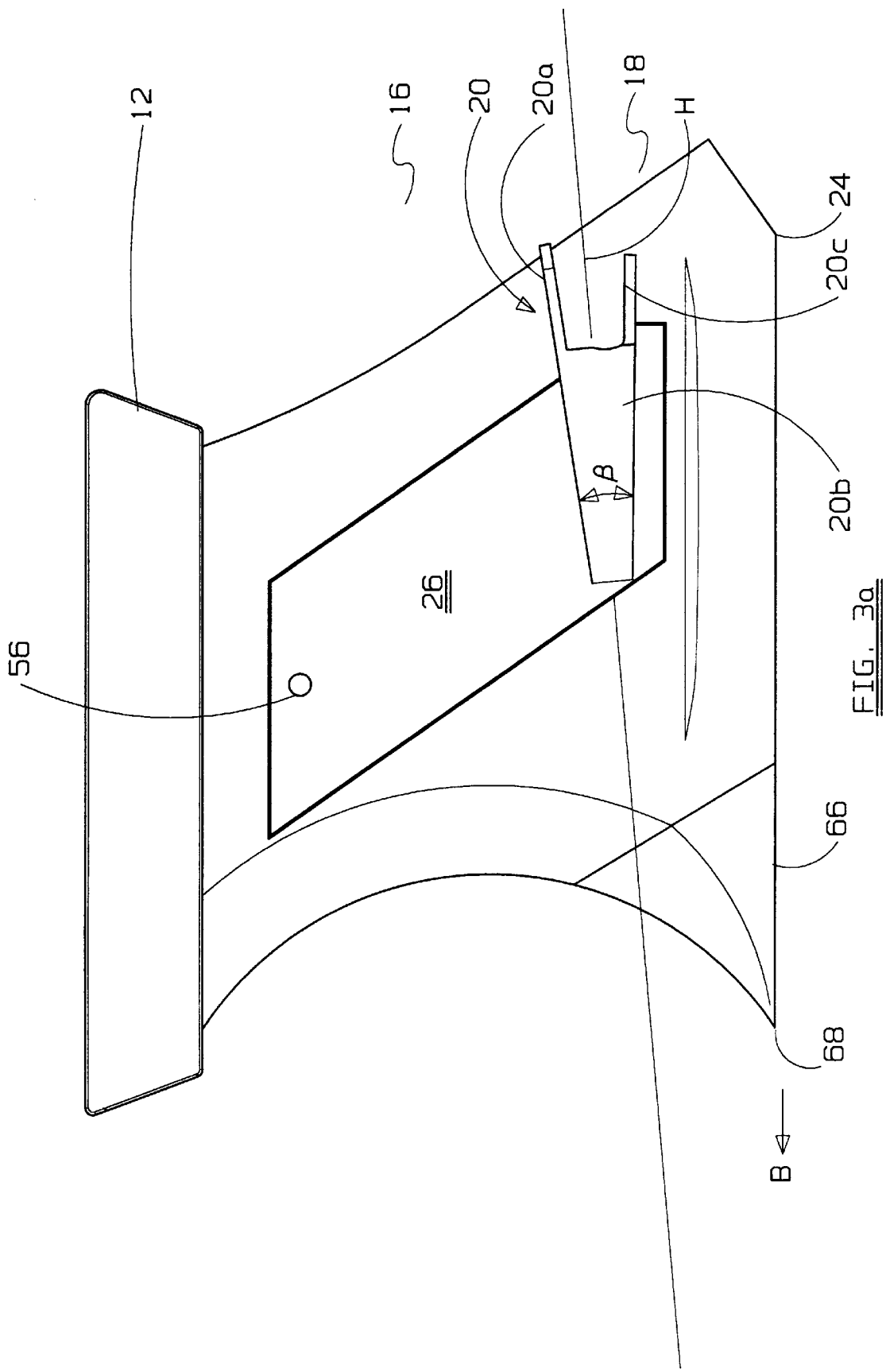
FIG. 3a is, in left side elevation view, an alternative embodiment of the device of FIG. 3.
Figure 4:
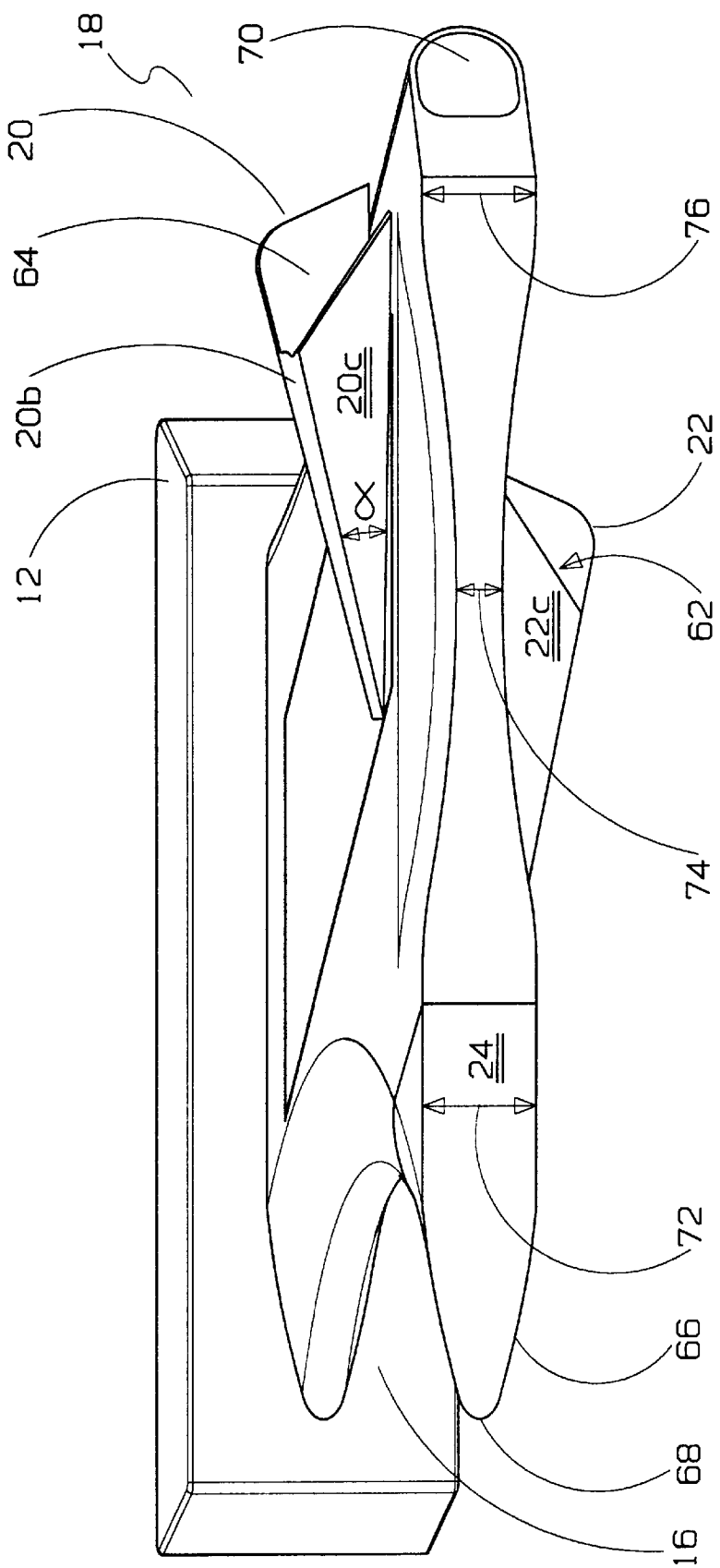
FIG. 4 is, in bottom perspective view, the device of FIG. 1.
Figure 5:
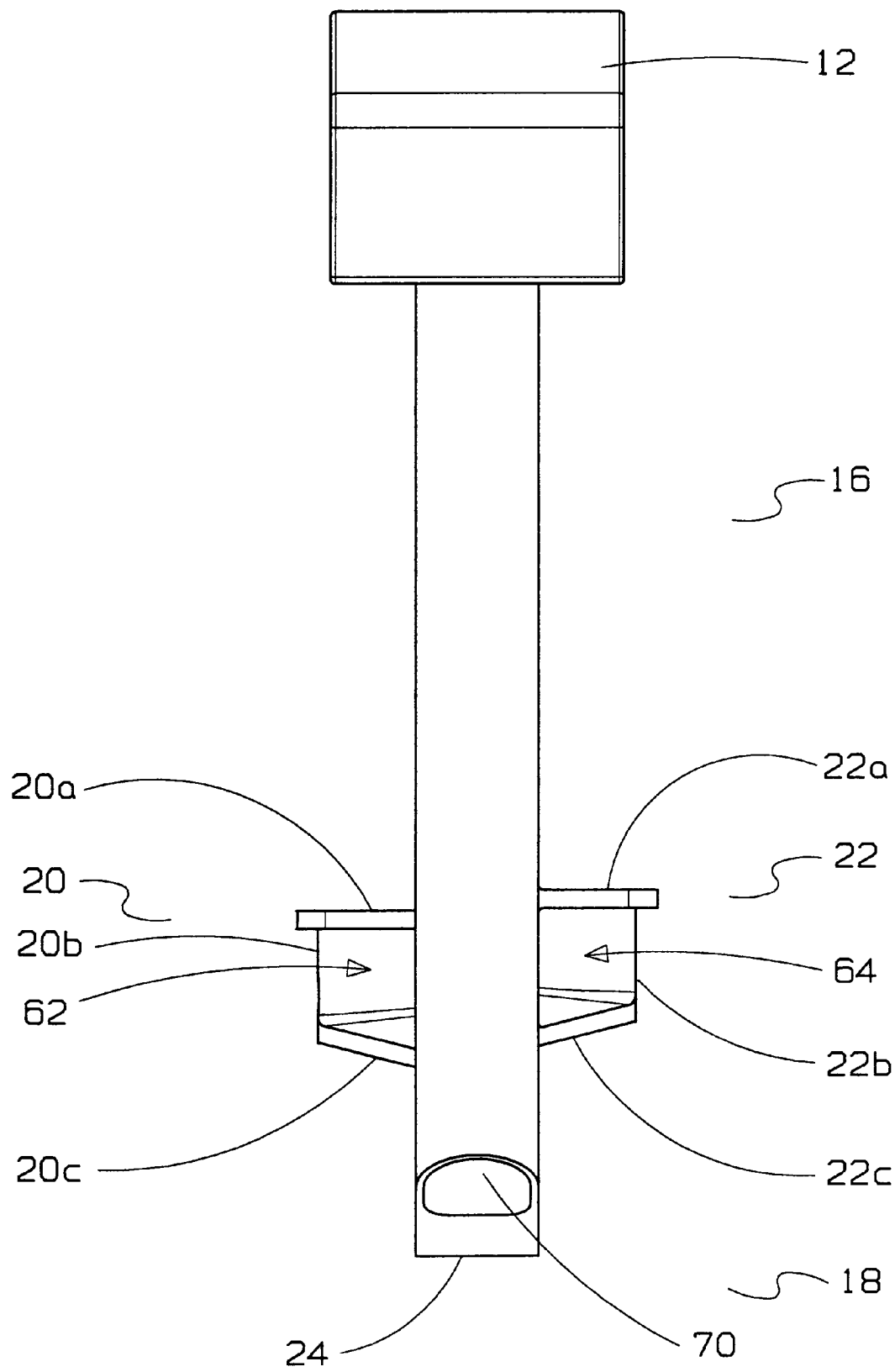
FIG. 5 is, in rear elevation view, the device of FIG. 1.

Wings 20 and 22 are each shaped as truncated wedges or otherwise as what may be described as irregular pyramid shapes wherein the vertex of each wedge or pyramid is aligned so as to be forward facing (in direction B) with the wedge diverging aft so as to form correspondingly shaped interior ducts 62 and 64 opening aft through the base of the wedges. In one preferred embodiment, the acute angles alpha ($\alpha$) and beta ($\beta$), formed at the vertex of the wedges forming wings 20 and 22, are each approximately 5 degrees. In the preferred embodiment upper surfaces 20a and 22a, lateral surfaces 20b and 22b, and lower surfaces 20c and 22c of wings 20 and 22 respectively are each generally planar. In one embodiment such as seen in FIG. 3a, the upper surfaces 20a and 22a are inclined forwardly further downwardly relative to the plane containing foot lower surface 24. Thus, a plane H bisecting angle $\beta$ would in this embodiment advantageously form an angle of approximately 5° relative to the plane F containing foot lower surface 24.

Upper surfaces 20a and 22a extend aft and are cantilevered outwardly over the aft apertures of interior ducts 62 and 64. The aft apertures of interior ducts 62 and 64 are advantageously formed by reducing the longitudinal length of lateral side walls 20b and 22b and raking the rearmost edge of lower surfaces 20c and 22c so as to extend them contiguously aft from the rear edge of lateral side walls 20b and 22b respectively to blend with foot 18.

In the preferred embodiment, foot 18 is curvaceously waisted along its longitudinal length so as to form between curved side walls a forward expanded lateral dimension 72 smoothly tapering into a reduced lateral dimension 74 corresponding to the waisting and, progressing aft, a gentle flaring to an aft expanded lateral dimension 76. In the preferred embodiment the waist of foot 18 approximately corresponds, in the longitudinal direction of axis A', to the position of the forward ends of wings 20 and 22.

Figure 6:
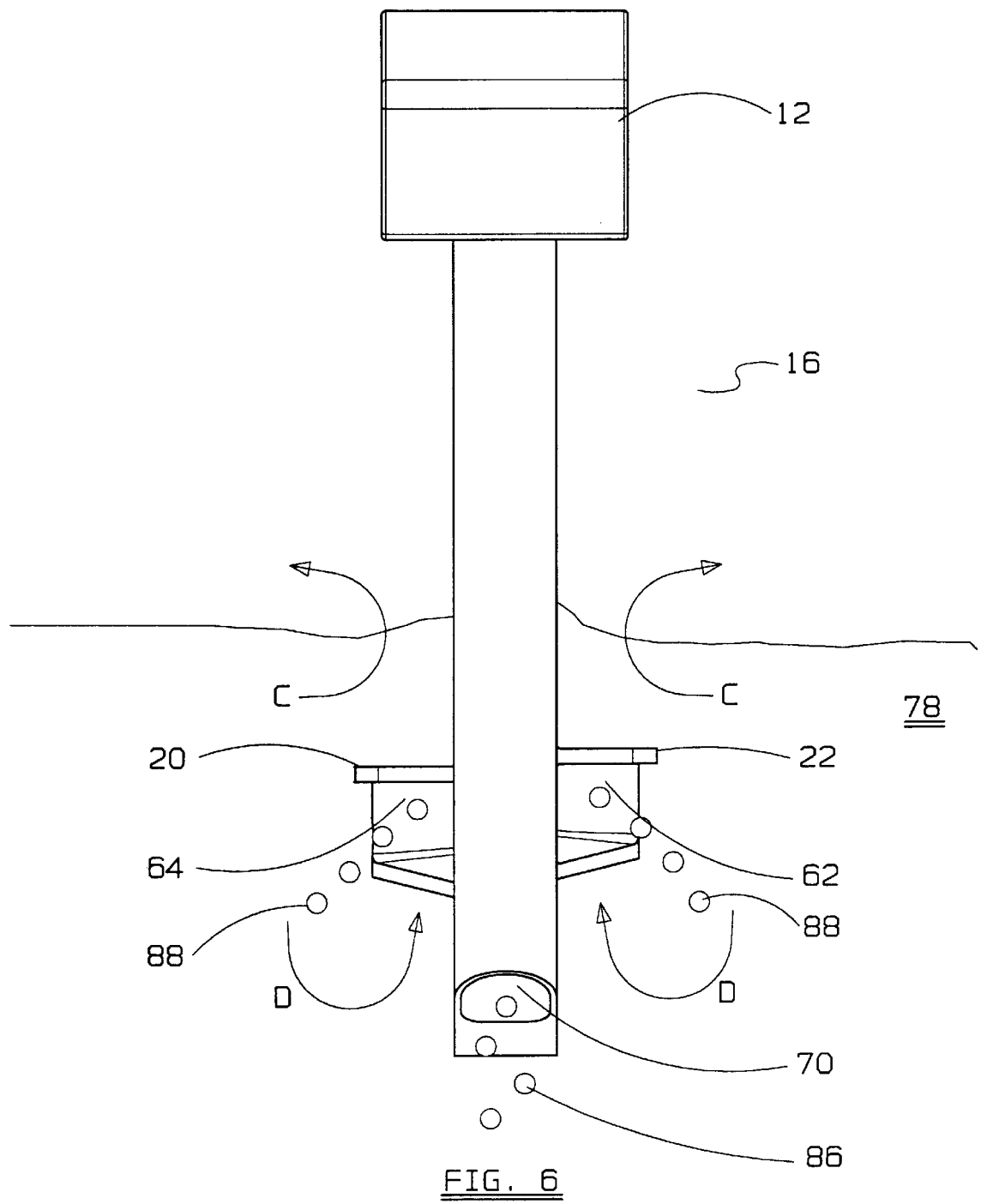
FIG. 6 is the view of FIG. 5 as the blade is passed through soil.

In use, blade 16 is translated in direction B through soil 78. As seen in FIG. 6, blade 16 is driven forwardly and positioned so as to maintain wings 20 and 22 submerged at a shallow depth below the surface of soil 78. Such motion opens the soil upwardly from point 68 on toe 66, upwardly along the leading edge of foot 18 and blade 16 causing a small lifting and separating of soil 78 in opposite directions C. As blade 16 translates through the soil, material fed into ports 30, 32 and 34 flows under the force of gravity through respective channels 36, 38 and 40. Material flowing through channel 40 exits through aperture 70 at the lowermost position of the narrow furrow 80 seen in FIG. 7 formed in soil 78 by the passing of blade 14 therethrough. The passing of wings 20 and 22 through soil 78 form shelves 82 in the soil as the soil is displaced by the wings so as to form shoulders 84 approximated in the illustration of FIG. 7.

The forward movement in direction B of blade 14 through soil 78 draws material such as fertilizer 86 from aperture 70, and also draws material such as seeds 88 from ducts 62 and 64 as the seeds are fed from channels 36 and 38 through outlet ports 58 and 60 respectively.

Figure 7:
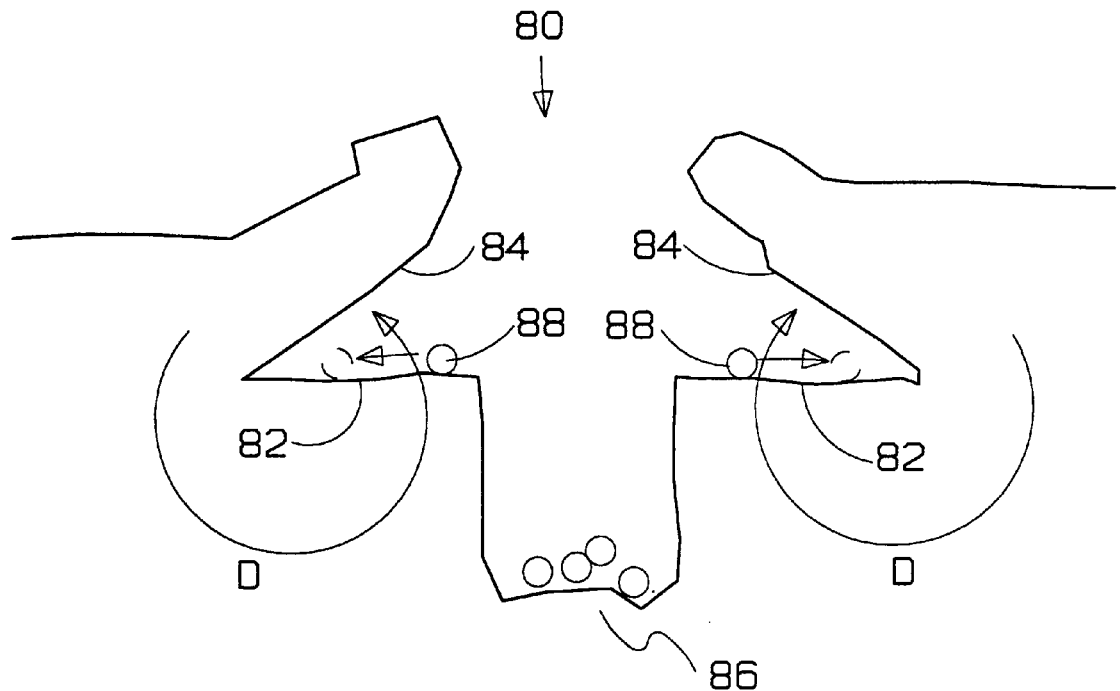
FIG. 7 is the rear elevation view of FIG. 6 with the device of the present invention removed for clarity so as to illustrate an approximation of the soil mechanics during an initial seed placing and fertilizing phase.
Figure 8:
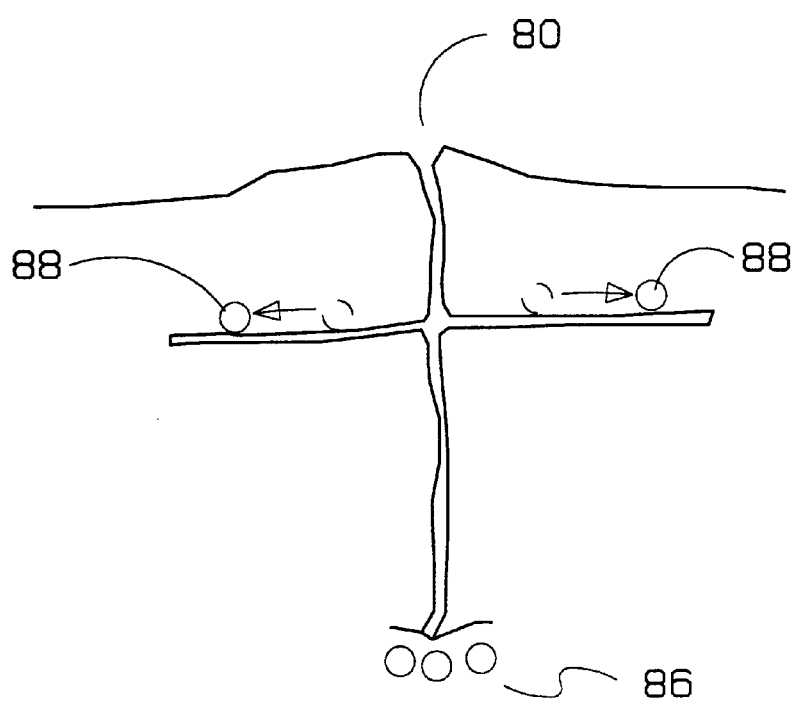
FIG. 8 follows on as a time-elapsed view of the view of FIG. 7, illustrating the collapse of the soil and lateral translation of the seeds following the initial phase.

It has been found that the passing of wings 20 and 22 and the passing of foot 18 in their form as described herein, causes a fluid-like circulation in direction D of soil 78 aft of wings 20 and 22. It is understood that the view of FIG. 7 is an approximation of the cross-section through the soil immediately behind blade 14 as it is translating through the soil. The soil, acting in a fluid manner, collapses so as to drop down shoulders 84 as the soil beneath shelves 82 is circulated in counter-rotation in direction D. Applicant has found that this circulation transports seeds 88 laterally outwardly along shelves 82 so as to facilitate advantageous lateral spacing apart of seeds on either side of furrow 80 separated both laterally and vertically from fertilizer 86 so as to inhibit chemical burning of the seeds for example by reason of the spacial relationship approximated by the illustration of FIG. 8.

It is understood that the order and type of materials introduced into ports 30, 32 and 34 may be changed as would be known to one skilled in the art so as to introduce, for example, seeds through ports 30 and 32 and water through port 34. A person skilled in the art would also understand that ports 30, 32 and 34 would have to be attached by appropriate conduits to corresponding hoppers or reservoirs.

Figure 2:
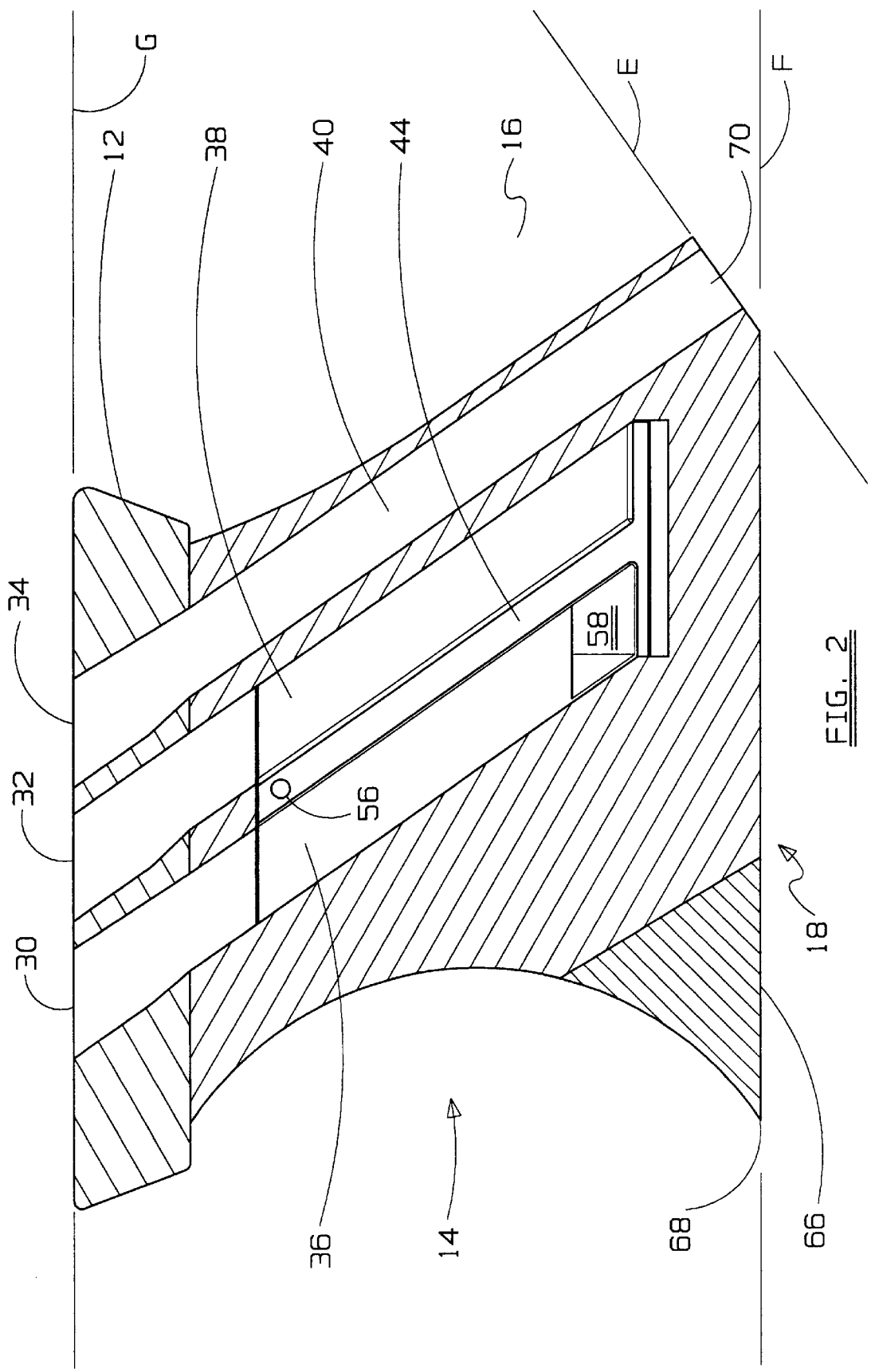
FIG. 2 is a cross-sectional view along line 2—2 in FIG. 1.

In the preferred embodiment, although not intended to be limiting, certain planes assist in defining the relationship of the elements of the present invention relative to one another as described above and claimed hereinbelow. Firstly, blade structure 14 is generally bisected by a first plane A, referred to above as coinciding with the plane of symmetry of trunk 16, which contains both the axis A' and the cross-sectional view reference line 2—2 seen in FIG. 1. The cross-sectional view of FIG. 2 is a view through a cutaway along first plane A. A second plane E is the plane containing the edges of aperture 70 at the lowermost end of channel 40. A third plane F is the plane containing foot lower surface 24. A fourth plane G is the plane containing the upper surface of mounting block 12. Lastly, a wing bisecting plane H bisects wing 20 by bisecting angle beta and a corresponding parallel wing bisecting plane bisects wing 22 by bisecting the corresponding angle on wing 22.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A sub-surface seeding, fertilizing and watering device comprising:

an opening blade, said opening blade having first and second sides extending between a leading edge and all aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second infeed ports and corresponding said first and second aft opening wing apertures for seed fertilizer or fluid flow, as fed from said material feeder, therethrough during said forward translation, wherein said first and second distances are less than said first submerged depth so that said first and second wings are submerged in the soil during said forward translation, wherein said first and second sides have upper portions generally located between said first and second wings and said upper surface, and lower portions generally located between said first and second wings and said lower surface, and wherein said lower portions collectively from a waisted shoe sole shape so that a forward width dimension of a forward flared portion of said opening blade and an aft width dimension of an aft flared portion of said opening blade, said forward and aft width dimensions extending between said lower portions of said first and second sides, are greater than an intermediate width dimension of a curvaceously waisted portion longitudinally extending contiguously between and smoothly flaring into said forward and aft flared portions.

2. The device of claim 1 wherein said opening blade further comprises a third conduit extending in material flow communication between a third infeed port in said upper surface and an aft opening blade aperture in a rearward position on said opening blade in proximity to said aft edge for seed, fertilizer or fluid flow, as fed from said material feeder, therethrough during said forward translation.

3. The device of claim 2 wherein said aft-opening blade aperture is centrally disposed relative to said first plane so as to lie generally symmetrically across said first plane.

4. The device of claim 3 wherein said aft-opening blade aperture intersects said lower surface.

5. The device of claim 4 wherein said aft-opening blade aperture is formed at the intersection of said lower surface and said aft edge.

6. The device of claim 5 wherein said aft-opening blade aperture lies in a second plane at generally 30° inclined relative to a third plane generally containing said lower surface, wherein said third plane is generally orthogonal to said first plane.

7. The device of claim 2 wherein said first, second and third conduits are generally parallel and raked aft of corresponding said first, second and third infeed ports.

8. The device of claim 7 wherein said first, second and third conduits are raked aft at an angle of approximately 55° relative to a fourth plane generally containing said upper surface.

9. The device of claim 7 wherein at least said first and second conduits are formed by mating of corresponding opposed facing channels in oppositely mounted side panels, oppositely mounted in said first and second sides.

10. The device of claim 9 wherein said third conduit is generally parallel and adjacent said aft edge.

11. The device of claim 1 wherein said leading edge is concavely curved and forms a pointed toe at an intersection of said leading edge and said lower surface.

12. The device of claim 11 wherein said pointed toe is made of hardened material relative to the hardness of material forming the balance of said opening blade.

13. The device of claim 11 wherein said opening blade has a longitudinal length dimension and a height dimension, said longitudinal length dimension perpendicular to said height dimension and both lying in said first plane, and wherein said opening blade has a lateral width dimension perpendicular to said first plane, said longitudinal length dimension extending between said leading and aft edges, said height dimension extending between said upper and lower surfaces, and said lateral width dimension extending between said first and second sides, wherein said length dimension is much greater than said width dimension, and wherein said height dimension is greater than said submerged depth, and wherein said first and second wings are wedge-shaped and said forward wing edges are vertices of said wedge-shaped wings.

14. The device of claim 13 wherein said first wing is set back a first longitudinal distance from said leading edge and said second wing is set back a second longitudinal distance from said leading edge, and wherein said first longitudinal distance is greater than said second longitudinal distance, said first wing mounted to said first side at a first longitudinal location generally corresponding to said aft fared portion and said second wing mounted to said second side at a second longitudinal location generally corresponding to said waisted portion.

15. The device of claim 13 wherein an upper wing surface on said first and second wings extends aft over corresponding said first and second aft-opening wing apertures on aft cantilevered upper wing members.

16. The device of claim 15 wherein a lower wing surface on said first and second wings forms a first wedge angle of approximately 5° with said upper wing surface.

17. The device of claim 16 wherein laterally outer-most wing surfaces extend between said upper and lower wing surfaces on said first and second wings, and wherein said outer-most wing surfaces intersect corresponding said first and second sides at corresponding said first and second forward wing edges.

18. The device of claim 17 wherein said outer-most wing surfaces form a second wedge angle of approximately 5° with said first and second sides respectively.

19. The device of claim 15 wherein said first and second wings are inclined downwardly so that a pair of corresponding planes bisecting a wedge angle between upper and lower wing surfaces on each of said first and second wings, said pair of corresponding planes containing corresponding said forward wing edges, are inclined forwardly and downwardly at approximately 5° relative to a generally horizontal plane containing said lower surface.

20. The device of claim 1 wherein said first and second wings are wedge-shaped and said forward wing edges are vertices of said wedge-shaped wings.

21. The device of claim 20 wherein said first wing is set back a first longitudinal distance from said leading edge and said second wing is set back a second longitudinal distance from said leading edge, and wherein said first longitudinal distance is greater than said second longitudinal distance, said first wing mounted to said first side at a first longitudinal location generally corresponding to said aft flared portion and said second wing mounted to said second side at a second longitudinal location generally corresponding to said waisted portion.

22. The device of claim 20 wherein an upper wing surface on said first and second wings extends aft over corresponding said first and second aft-opening wing apertures on aft cantilevered upper wing members.

23. The device of claim 22 wherein a lower wing surface on said first and second wings forms a first wedge angle of approximately 5° with said upper wing surface.

24. The device of claim 23 wherein laterally outer-most wing surfaces extend between said upper and lower wing surfaces on said first and second wings, and wherein said outer-most wing surfaces intersect corresponding said first and second sides at corresponding said first and second forward wing edges.

25. The device of claim 24 wherein said outer-most wing surfaces form a second wedge angle of approximately 5° with said first and second sides respectively.

26. The device of claim 22 wherein said first and second wings are inclined downwardly so that a pair of corresponding planes bisecting a wedge angle between upper and lower wing surfaces on each of said first and second wings, said pair of corresponding planes containing corresponding said forward wing edges, are inclined forwardly and downwardly at approximately 5° relative to a generally horizontal plane containing said lower surface.

27. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending front, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second indeed ports and corresponding said first and second aft opening wing apertures for seed fertilizer or fluid flow, as fed from said material feeder therethrough during said forward translation, wherein said first and second distances are less than said first submerged depth so that said first and second wings are submerged in the soil during said forward translation, wherein said opening blade farther comprises a third conduit extending in material flow communication between a third infeed port in said upper surface and an aft opening blade aperture in a rearward position on said opening blade in proximity to said aft edge for seed, fertilizer or fluid flow, as fed from said material feeder, therethrough during said forward translation, wherein said aft-opening blade aperture is centrally disposed relative to said first plane so as to lie generally symmetrically across said first plane, wherein said aft-opening blade aperture intersects said lower surface, wherein said aft-opening blade aperture is formed at the intersection of said lower surface and said aft edge, wherein said aft-opening blade aperture lies in a second plane at generally 30° inclined relative to a third plane generally containing said lower surface, wherein said third plane is generally orthogonal to said first plane.

28. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second infeed ports and corresponding said first and second aft opening wing apertures for seed, fertilizer or fluid flow, as fed from said material feeder, therethrough during said forward translation, wherein said first and second distances are less than said first submerged depth so that said first and second wings are submerged in the soil during said forward translation, wherein said opening blade further comprises a third conduit extending in material flow communication between a third infeed port in said upper surface and an all opening blade aperture in a rearward position on said opening blade in proximity to said aft edge for seed, fertilizer or fluid flow, as fed from said material feeder, therethrough during said forward translation, wherein said first, second and third conduits are generally parallel and raked aft of corresponding said first, second and third infeed ports.

29. The device of claim 28 wherein said first, second and third conduits are raked aft at an angle of approximately 55° relative to a fourth plane generally containing said upper surface.

30. The device of claim 28 wherein at least said first and second conduits are formed by mating or corresponding opposed facing channels in oppositely mounted side panels, oppositely mounted in said first and second sides.

31. The device of claim 30 wherein said third conduit is generally parallel and adjacent said aft edge.

32. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second infeed ports and corresponding said first and second aft opening wing apertures for seed, fertilizer or fluid flow, as fed from said material feeder, therethrough during said forward translation, wherein said first and second distances are less than said first submerged depth so that said first and second wings are submerged in the soil during said forward translation, wherein said leading edge is concavely curved and forms a pointed toe at an intersection of said leading edge and said lower surface, wherein said pointed toe is made of hardened material relative to the hardness of material forming the balance of said opening blade.

33. The device of claim 32 wherein said opening blade has a longitudinal length dimension and a height dimension, said longitudinal length dimension perpendicular to said height dimension and both lying in said first plane, and wherein said opening blade has a lateral width dimension perpendicular to said first plane, said longitudinal length dimension extending between said leading and aft edges, said height dimension extending between said upper and lower surfaces, and said lateral width dimension extending between said first and second sides, wherein said length dimension is much greater than said width dimension, and wherein said height dimension is greater than said submerged depth, and wherein said first and second wings are wedge-shaped and said forward wing edges are vertices of said wedge-shaped wings, wherein said first and second sides have upper portions generally located between said first and second wings and said upper surface, and lower portions generally located between said first and second wings and said lower surface, and wherein said lower portions collectively form a waisted shape so that a forward width dimension of a forward flared portion of said opening blade and an aft width dimension of an aft flared portion of said opening blade, said forward and aft width dimensions extending between said lower portions of said first and second sides, are greater than an intermediate width dimension of a waisted portion longitudinally extending contiguously between said forward and aft flared portions, wherein said first wing is set back a first longitudinal distance from said leading edge and said second wing is set back a second longitudinal distance from said leading edge, and wherein said first longitudinal distance is greater than said second longitudinal distance, said first wing mounted to said first side at a first longitudinal location generally corresponding to said aft flared portion and said second wing mounted to said second side at a second longitudinal location generally corresponding to said waisted portion.

34. The device of claim 32 wherein said opening blade has a longitudinal length dimension and a height dimension, said longitudinal length dimension perpendicular to said height dimension and both lying in said first plane, and wherein said opening blade has a lateral width dimension perpendicular to said first plane, said longitudinal length dimension extending between said leading and aft edges, said height dimension extending between said upper and lower surfaces, and said lateral width dimension extending between said first and second sides, wherein said length dimension is much greater than said width dimension, and wherein said height dimension is greater than said submerged depth, and wherein said first and second wings are wedge-shaped and said forward wing edges are vertices of said wedge-shaped wings, wherein said first and second sides have upper portions generally located between said first and second wings and said upper surface, and lower portions generally located between said first and second wings and said lower surface, and wherein said lower portions collectively form a waisted shape so that a forward width dimension of a forward flared portion of said opening blade and an aft width dimension of an aft flared portion of said opening blade, said forward and aft width dimensions extending between said lower portions of said first and second sides, are greater than an intermediate width dimension of a waisted portion longitudinally extending contiguously between said forward and aft flared portions, wherein an upper wing surface on said first and second wings extends aft over corresponding said first and second aft-opening wing apertures on aft cantilevered upper wing members, wherein a lower wing surface on said first and second wings forms a first wedge angle of approximately 5° with said upper wing surface.

35. The device of claim 34 wherein laterally outer-most wing surfaces extend between said upper and lower wing surfaces on said first and second wings, and wherein said outer-most wing surfaces intersect corresponding said first and second sides at corresponding said first and second forward wing edges.

36. The device of claim 35 wherein said outer-most wing surfaces form a second wedge angle of approximately 5° with said first and second sides respectively.

37. The device of claim 34 wherein said first and second wings are inclined downwardly so that a pair of corresponding planes bisecting a wedge angle between upper and lower wing surfaces on each of said first and second wings, said pair of corresponding planes containing corresponding said forward wing edges, are inclined forwardly and downwardly at approximately 5° relative to a generally horizontal plane containing said lower surface.

38. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second infeed ports and corresponding said first and second aft opening wing apertures for seed, fertilizer or fluid flow, as red from said material feeder, therethrough during said forward translation, wherein said first and second distances are less than said first submerged depth so that said first and second wings are submerged in the soil during said forward translation.

39. The device of claim 38 wherein an upper wing surface on said first and second wings extends aft over corresponding said first and second aft-opening wing apertures on aft cantilevered upper wing members.

40. The device of claim 39 wherein a lower wing surface on said first and second wings forms a first wedge angle of approximately 5° with said upper wing surface.

41. A sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade mountable to a material feeder so as to be generally vertically disposed when mounted thereon for partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft opening wing apertures, said first and second conduits and corresponding said first and second wing ducts thereby in material flow communication between said first and second infeed ports and corresponding said first and second aft opening wing apertures for seed, fertilizer or fluid flow, as fed from said material feeder, therethrough during said forward translation, wherein said first and second distances are less than said first submerged depth so that said first and second wings are submerged in the soil during said forward translation, wherein said first and second wings are wedge-shaped and said forward wing edges are vertices of said wedge-shaped wings, wherein said first and second sides have upper portions generally located between said first and second wings and said upper surface, and lower portions generally located between said first and second wings and said lower surface, and wherein said lower portions collectively form a waisted shape so that a forward width dimension of a forward flared portion of said opening blade and an aft width dimension of an aft flared portion of said opening blade, said forward and aft width dimensions extending between said lower portions of said first and second sides, are greater than an intermediate width dimension of a waisted portion longitudinally extending contiguously between said forward and aft flared portions, wherein ran upper wing surface on said first and second wings extends aft over corresponding said first and second aft-opening wing apertures on aft cantilevered upper wing members.

42. The device of claim 41 wherein a lower wing surface on said first and second wings forms a first wedge angle of approximately 5° with said upper wing surface.

43. The device of claim 42 wherein laterally outer-most wing surfaces extend between said upper and lower wing surfaces on said first and second wings, and wherein said outer-most wing surfaces intersect corresponding said first and second sides at corresponding said first and second forward wing edges.

44. The device of claim 43 wherein said outer-most wing surfaces form a second wedge angle of approximately 5° with said first and second sides respectively.

45. The device of claim 41 wherein said first and second wings are inclined downwardly so that a pair of corresponding planes bisecting a wedge angle between upper and lower wing surfaces on each or said first and second wings, said pair of corresponding planes containing corresponding said forward wing edges, are inclined forwardly and downwardly at approximately 5° relative to a generally horizontal plane containing said lower surface.

* * * * *